United States Patent
Peltola et al.

(10) Patent No.: US 7,218,937 B2
(45) Date of Patent: May 15, 2007

(54) METHOD AND A SYSTEM OF SHARING RESOURCES

(75) Inventors: Jukka Peltola, Oulu (FI); Harri Posti, Oulu (FI); Kari Reponen, Kontio (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/519,001

(22) PCT Filed: Jun. 28, 2002

(86) PCT No.: PCT/IB02/02518

§ 371 (c)(1),
(2), (4) Date: Feb. 24, 2005

(87) PCT Pub. No.: WO2004/004398

PCT Pub. Date: Jan. 8, 2004

(65) Prior Publication Data

US 2006/0094434 A1 May 4, 2006

(51) Int. Cl.
*H04Q 7/20* (2006.01)
(52) U.S. Cl. ................ 455/453; 455/442; 455/454
(58) Field of Classification Search ............. 455/439, 455/442, 443, 436, 444, 445, 450, 452.1, 455/452.2, 453
See application file for complete search history.

(56) References Cited

U.S. PATENT DOCUMENTS

| 6,400,946 | B1 | 6/2002 | Vazvan et al. |
| 6,574,475 | B1* | 6/2003 | Suzuki ................. 455/438 |
| 6,574,476 | B1* | 6/2003 | Williams ............. 455/452.1 |
| 6,829,482 | B2* | 12/2004 | Rune et al. .......... 455/442 |
| 2005/0124353 | A1* | 6/2005 | Cave ..................... 455/453 |

FOREIGN PATENT DOCUMENTS

| WO | WO 00/08884 | 2/2000 |
| WO | WO 01/59986 | 8/2001 |

* cited by examiner

*Primary Examiner*—Temica Beamer
*Assistant Examiner*—Joy Contee
(74) *Attorney, Agent, or Firm*—Squire, Sanders & Dempsey L.L.P.

(57) ABSTRACT

Disclosed are a method and a system of sharing resources between operators in cellular mobile communication networks, wherein each operator comprises its own dedicated resource. The particularity of the present invention lies in that for a new connection, i.e. an incoming call and/or a handover, a serving operator (A) is enabled during operation to use another operator's (B) or other operators' (B, C, D, . . . ) resource(s), wherein said resource sharing is dynamical and seamless in a way that the new connection is not interrupted.

27 Claims, 6 Drawing Sheets

METHOD AND A SYSTEM OF SHARING RESOURCES

FIELD OF THE INVENTION

The present invention relates to a method and a system of sharing resources between operators in cellular mobile communication networks, wherein each operator comprises its own dedicated resource.

BACKGROUND OF THE INVENTION

The current 3G licence policy requires that all operators have to acquire their own licence which allows to use certain frequency bands. In particular, this applies to cellular network operators of the same area or country.

However, such a licence policy can lead to inefficient use of cellular infrastructure and radio spectrum as it is divided into small separate pools. So far, this problem has been partly addressed by national roaming and network hardware sharing only.

SUMMARY OF THE INVENTION

It is an object of the present invention to avoid the above mentioned drawbacks and in particular to enable an optimum radio resource management- and hardware usage.

In order to achieve the above and further objects, in accordance with a first aspect of the present invention, there is provided a method of sharing resources between operators in cellular mobile communication networks, wherein each operator comprises its own dedicated resource, characterized in that for a new connection, in particular an incoming call and/or a handover, a serving operator is enabled during operation to use another operator's or other operators' resource(s), wherein said resource sharing is dynamical and seamless in a way that the new connection is not interrupted.

According to a second aspect of the present invention, there is provided a system of sharing resources between operators in cellular mobile communication networks, characterized by means for enabling a serving operator for a new connection, in particular an incoming call and/or a handover, to dynamically and seamlessly share resource(s) from other operator(s) during operation in a way that the new connection is not interrupted.

Accordingly, the present invention discloses a method and a system of sharing resources between operators. While the serving operator which currently serves a connection has its own dedicated resource, it can use another operator's or even more operators' resources, either in real time (reactively) or in a proactive manner. This resource sharing is seamless in a way that the connection is not interrupted while sharing the other operator's resource.

So, the present invention enables a dynamic hardware and/or spectral sharing during a call. This results in an optimum resource management and utilization which provides one big combined frequency pool and/or hardware pool of all the operators in real time rather than several small separate pools as it is required under the current 3G licence policy. The end user does not need to experience a drop of the call when his serving operator can currently not offer sufficient resource anymore and another operator's resource is taken to use.

The decision for resource sharing can be done as per call. This is not either restricted to two operators only, but basically any number of operators sharing the same geographical coverage could be involved. So, the present invention is particularly dedicated for cellular network operators of the same area or country. Regarding hardware resource sharing, the operators should be geographically colocated. Concerning spectral resources, the operators should have spectral allocations within the same area.

There is likely to be a cost of using the other operator's resource. However, the present invention is not limited by certain business relationships between the operators.

Further advantageous embodiments of the present invention are defined in the dependent claims.

In particular, the dynamical sharing can be employed reactively or in a proactive manner.

In a preferred embodiment, the resource may be a frequency, a frequency band or a channel. Alternatively or additionally, the resource may comprise a radio frequency equipment and/or channel processing hardware.

In case each operator further comprises its own dedicated network infrastructure, during operation the serving operator is enabled to further use at least a part of the network infrastructure(s) of the other operator(s) in some cases as well. In particular, network infrastructure can comprise network equipment, sites, masts and/or antennas etc.

Preferably, the above mentioned sharing is carried out upon occurrence of a predetermined condition which, thus, defines a criterion for deciding on the usage of another operator's or other operators' resource(s). In particular, the use of the resource(s) of the other operator(s) can be triggered by a number of parameters representing certain conditions.

Such a predetermined condition can comprise exhaustion of coverage of said serving operator while other operators can provide sufficient coverage.

The predetermined condition can further comprise increase of load or overload in the serving operator's network. In particular, as a pro-active measure the serving operator can prepare some capacity from the other operator(s).

The predetermined condition can also comprise congestion wherein there are no free resources for incoming calls and/or handovers.

Moreover, the predetermined condition can comprise a situation affecting a predetermined quality of service, wherein in particular interferences on the serving operator's network are too high to fulfil requirements of service subscription for a particular customer requiring a high quality carrier.

Finally, the predetermined condition can comprise e.g. a situation wherein the costs for the connection are lower in another operator's network than in the serving operator's network.

It is noted that the above mentioned predetermined conditions are given as examples, but not limited thereto.

Preferably, the sharing enabling means can be included in a radio resource management means.

BRIEF DESCRIPTION OF THE DRAWINGS

In the following, the present invention will be described in greater detail based on preferred embodiments with reference to the accompanying drawings, in which.

DESCRIPTION OF PREFERRED EMBODIMENTS

In the following, the present invention will be described in greater detail based on preferred embodiments.

Figure 1:
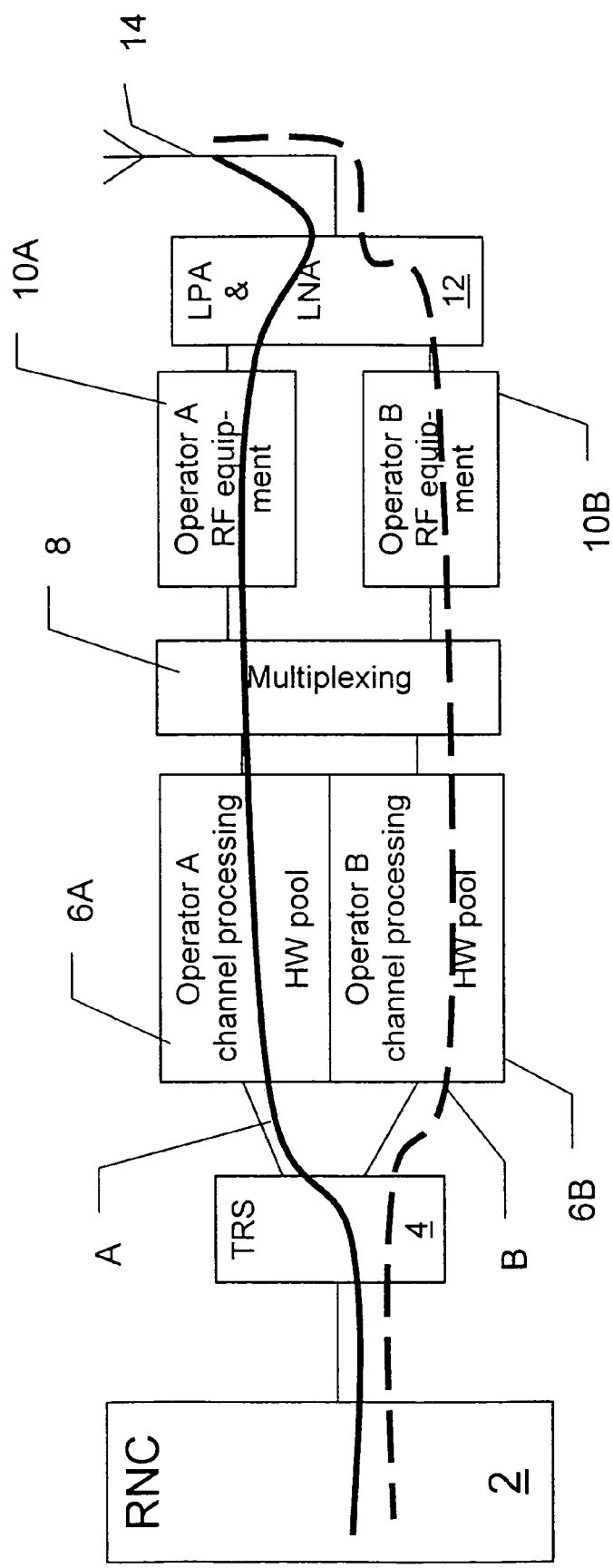
FIG. 1 is a schematic block diagram of a portion of a cellular mobile communication network system including two operators wherein for calls of both operators their own respective dedicated part of the infrastructure is used.

In FIG. 1 a portion of a cellular mobile communication network infrastructure is shown which portion comprises a radio network controller (RNC) 2 which is connected to a transmission equipment (TRS) 4. The portion of the network infrastructure shown in FIG. 1 is dedicated to two operators A and B. Accordingly, two channel processing hardware pools 6A and 6B are provided, namely the one for operator A and the other for operator B, whose inputs are coupled to outputs of the transmission equipment 4. The outputs of the channel processing hardware pools 6A and 6B each are connected to corresponding inputs of a multiplexer 8. The multiplexer 8 has two outputs in the shown example, wherein the one output is coupled to operator's A radio frequency equipment 10A and the other output is coupled to operator's B radio frequency equipment 10B. Both operators' radio frequency equipment is connected with a linear power amplifier and low noise amplifier (LPA & LNA) module 12 which is coupled to a shared antenna 14.

Further, FIG. 1 shows the normal case of both operators' call paths wherein the calls of both operators A and B use their own respective dedicated part of the shared infrastructure portion. Namely, in this normal case the operator's A call runs through the operator's A channel processing hardware pool 6A and radio frequency equipment 10A, whereas the operator's B call runs through the operator's B channel processing hardware pool 6B and radio frequency equipment 10B.

As an example, two operators A and B are considered which are both allocated to a dedicated radio spectrum. During operation the radio frequency and/or HW capacity of the serving operator A which currently serves a connection becomes congested while the operator B has spare capacity available. The operator B could offer this available capacity for the serving operator A at a certain price. Instead of disappointing the customers, the serving operator A might decide to purchase capacity from the operator B and offer such service for its customers. If the time periods of congestion are short, this may be more cost-effective than adding more hardware or acquiring more spectrum. At least the upgrade of network capacity for the currently serving operator A could perhaps be deferred to a later date.

The decision as to the above mentioned sharing could be done as per call. This is not either restricted to two operators A and B only, but basically any number of operators A, B, C, D, ... sharing the same geographical coverage could be involved.

Such capacity sharing could take place in different situations or conditions. For example, there are the following conditions (but not limited to):

The coverage of the serving operator A is exhausted, while other operators B, C, D, ... can provide coverage (—network sharing has traditionally been used to address this problem).

The load is increasing in the serving operator's A network or the serving operator A is overloaded, and as a pro-active measure the serving operator A is preparing some capacity from another operator B.

In the serving operator's A network, congestion occurs, i.e. there are no free resources for incoming calls or handovers.

The quality of service QoS is affected, i.e. the interferences on the serving operator's A network became too high to fulfil requirements of service subscription for a particular customer requiring high quality carrier.

Figure 2:
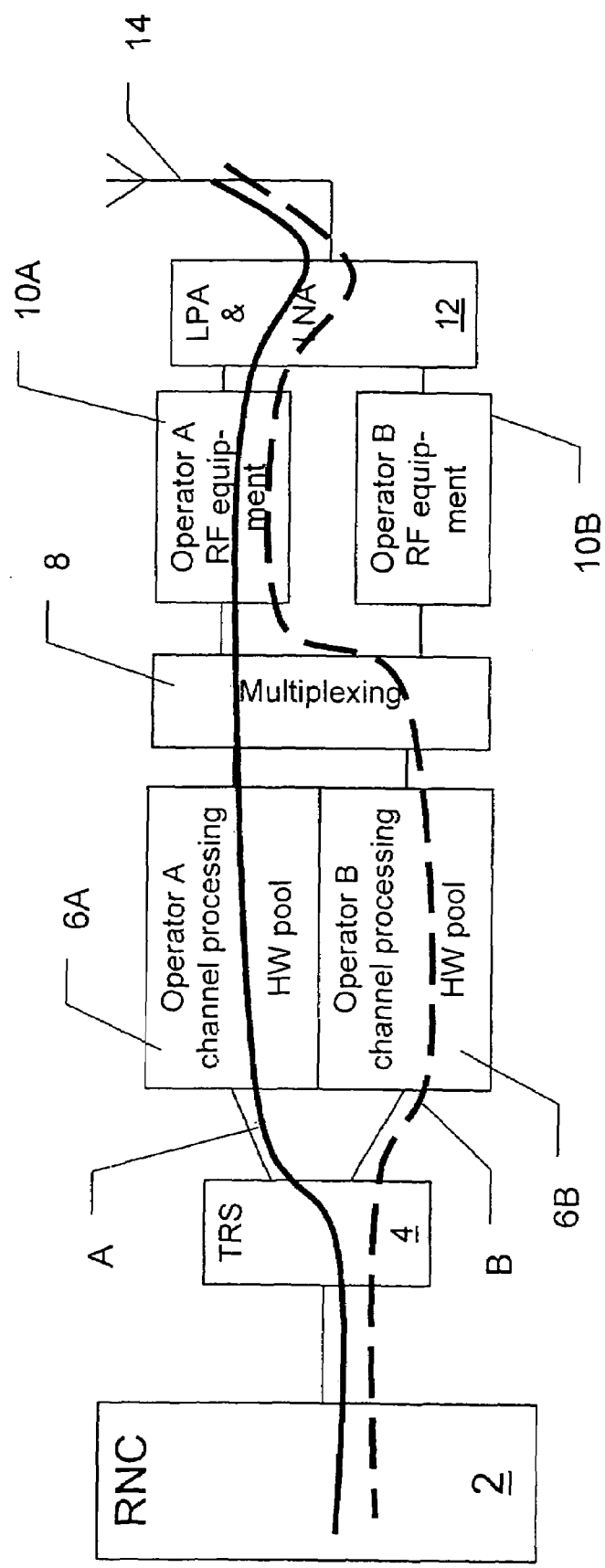
FIG. 2 is a schematic block diagram of a portion of a cellular mobile communication network system including two operators wherein for a call of the one operator the other operator's radio frequency equipment is used.
Figure 3:
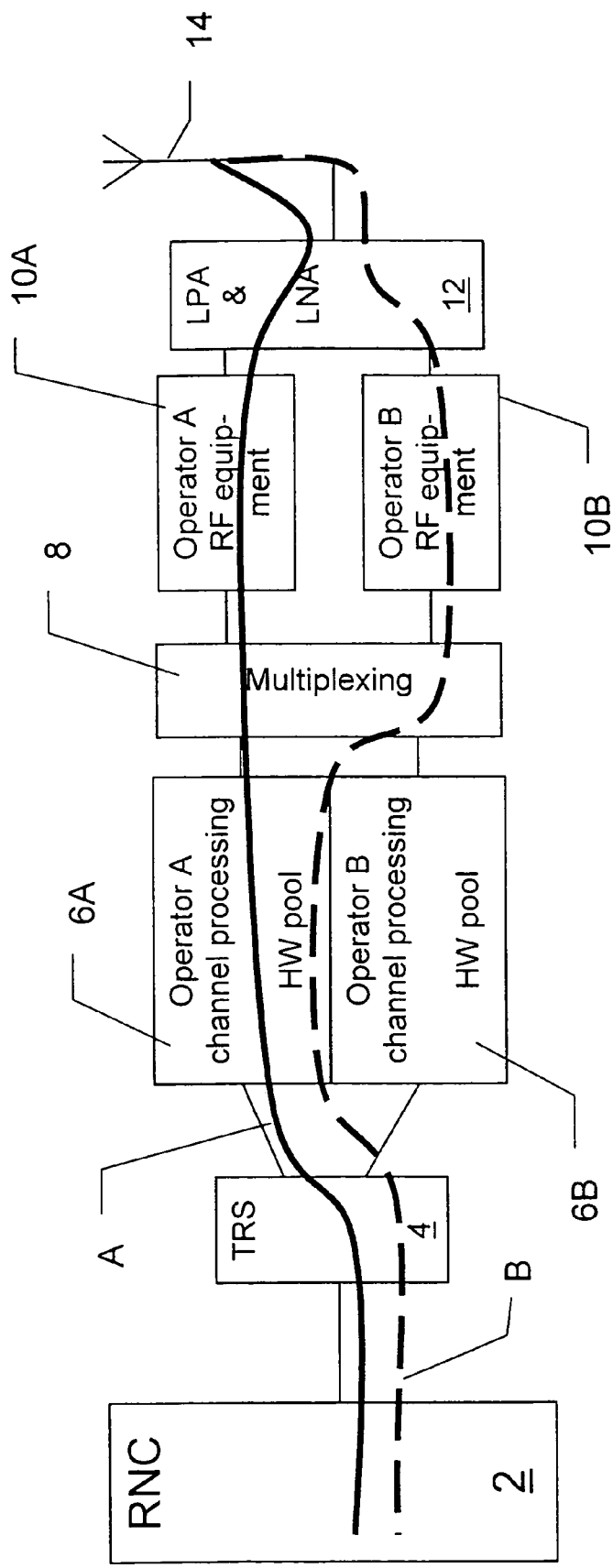
FIG. 3 is a schematic block diagram of a portion of a cellular mobile communication network system including two operators wherein for a call of the one operator the other operator's channel processing hardware is used.
Figure 4:
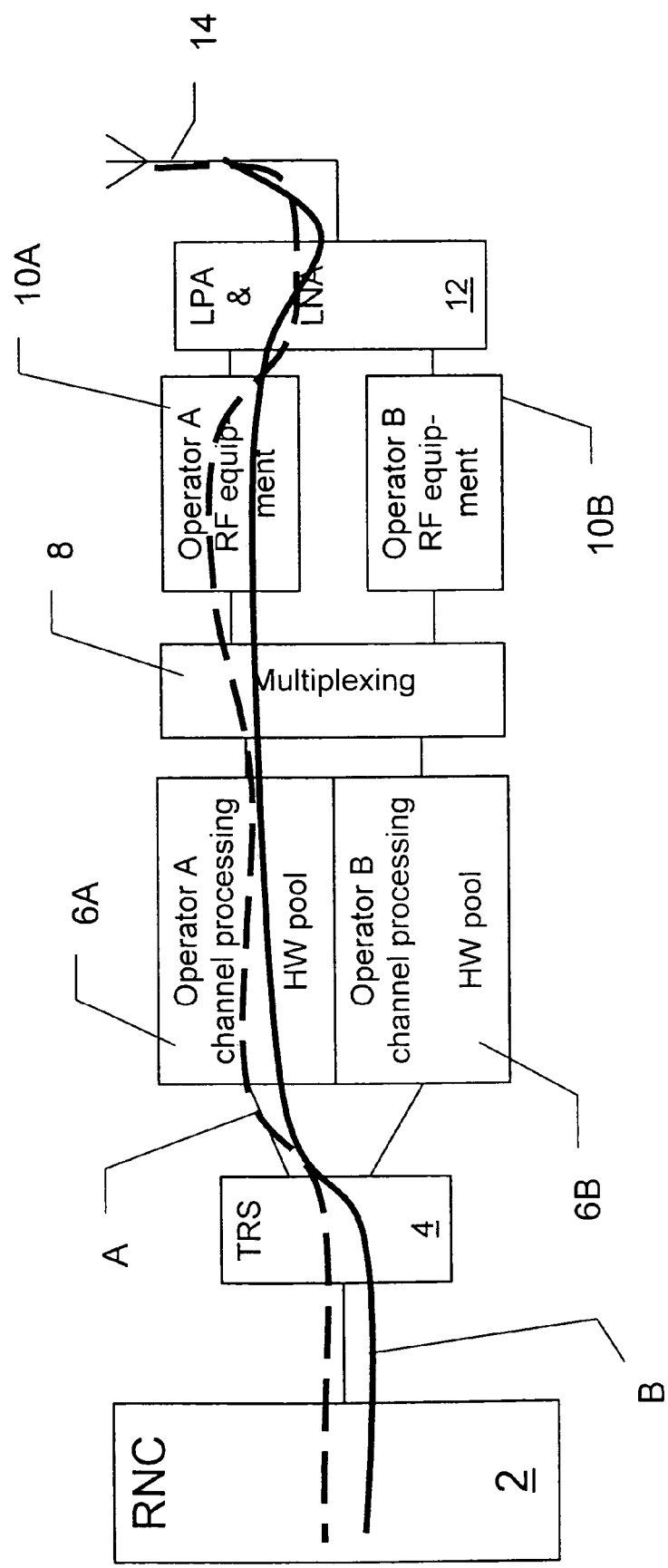
FIG. 4 is a schematic block diagram of a portion of a cellular mobile communication network system including two operators wherein for a call of the one operator the other operator's channel processing hardware and radio frequency equipment are used.

In FIGS. 2 to 4, the same portion as in FIG. 1 is shown, but wherein different hardware sharing processes are used for both operators' call paths.

In the situation shown in FIG. 2, there is sufficient channel processing hardware capacity available for each operator A and B, but e.g. the operator's B radio frequency equipment 10B are not sufficient to support the operator's B call so that the operator's B call uses the operator's A radio frequency equipment 10A.

In the situation shown in FIG. 3, there is not enough channel processing hardware capacity to support an incoming call of operator B, but the operator's B radio frequency equipment 10B is sufficient. So, the operator's B call uses the operator's A channel processing hardware pool 6A.

In the situation shown in FIG. 4, the operator's B own capacity, namely both the channel processing hardware pool 6B and the radio frequency equipment 10B, is fully used so that further incoming calls for operator B use both the operator's A channel processing hardware pool 6A and radio frequency equipment 10A.

It is noted that in the examples shown in FIGS. 1 to 4 only the channel-specific hardware is dedicated and all the other equipment is shared. However, any other equipment could also be dedicated.

Figure 5:
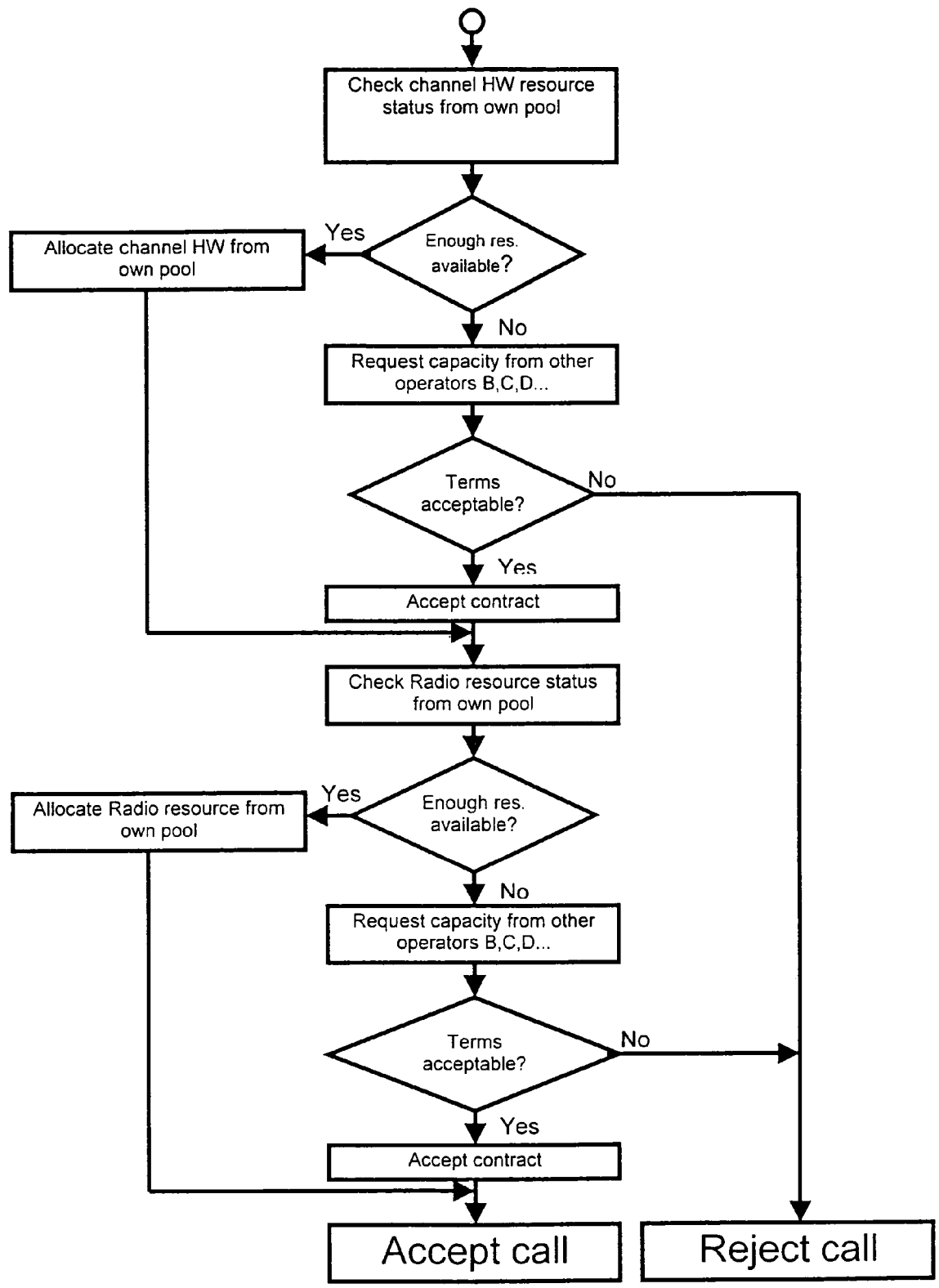
FIG. 5 is a schematic flow diagram showing a call setup process.

In addition, FIG. 5 is a schematic flow diagram showing a call setup process wherein as a result the incoming call is accepted or rejected.

Figure 6:
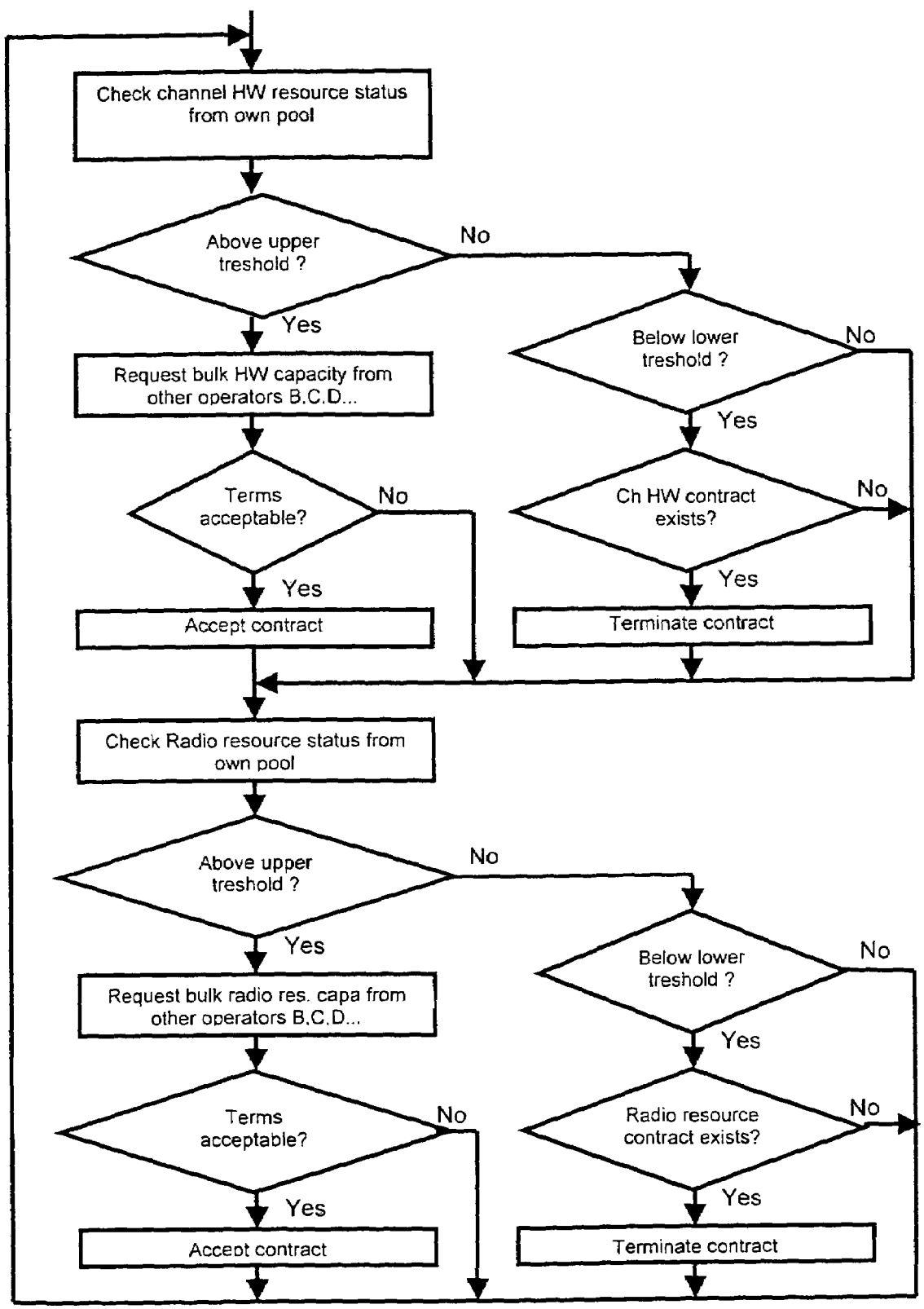
FIG. 6 is a schematic flow diagram showing a proactive resource reservation process.

Finally, FIG. 6 is a schematic flow diagram showing a proactive resource reservation process wherein as a result a channel hardware and/or radio resource contract is accepted or terminated.

Usage of another operator's radio resources can be done independently of the usage of his hardware. Also, the usage of another operator's hardware does not necessarily imply usage of his spectrum.

The costs for the serving operator A could be different in the above cases. In particular, bulk capacity acquired in a preventive case could be cheaper than that allocated per call. Each operator could determine their price in different cases based on the estimated impact to capacity and/or quality which the operator can offer to its own customers.

The communication of the requests and responses between the operator's equipments requires a physical connection and application protocols between the operator's equipment management (hardware sharing) and radio resource management (spectrum sharing) entities.

The invention claimed is:

1. A method of sharing resources between operators in cellular mobile communication networks, the method comprising:

enabling a service operator during operation to use another operator's or other operators' resources for a new connection during at least one of an incoming call or a handover;

wherein the operators cover the same geographical area, and said resource sharing is dynamical and seamless in a proactive manner so that the new connection is not interrupted, wherein each operator comprises its own dedicated resource.

2. The method according to claim 1, wherein said resource is a frequency, a frequency band or a channel.

3. The method according to claim 1, wherein said resource comprises a radio frequency equipment.

4. The method according to claim 1, wherein said resource comprises a channel processing hardware.

5. The method according to claim 1, wherein each operator further comprises its own dedicated network infrastructure, wherein during operation the serving operator is enabled to further use at least a part of the network infrastructure(s) of the other operator(s).

6. The method according to claim 1, wherein said resource sharing is carried out upon occurrence of a predetermined condition.

7. The method according to claim 5, wherein said further network infrastructure sharing is carried out upon occurrence of a predetermined condition.

8. The method according to claim 6, wherein said predetermined condition comprises exhaustion of coverage of said serving operator while other operators provide sufficient coverage.

9. The method according to claim 6, wherein said predetermined condition comprises increase of load or overload in the serving operator's network.

10. The method according to claim 6, wherein said predetermined condition comprises congestion wherein there are no free resources for a new connection.

11. The method according to claim 6, wherein said predetermined condition comprises a situation affecting a predetermined quality of service (QoS).

12. The method according to claim 11, wherein interferences on the serving operator's network are too high to fulfill requirements of service subscription for a particular customer requiring high quality carrier.

13. The method according to claim 6, wherein said predetermined condition comprises a situation wherein the costs for the connection are lower in another operator's network than in the serving operator's network.

14. A system of sharing resources between operators in cellular mobile communication networks, the system comprising:

enabling unit configured to enable a serving operator for a new connection, in particular an incoming call and/or a handover, wherein said enabling unit is provided to dynamically and seamlessly share resource(s) from other operator(s) of the same geographical area during operation in a proactive manner so that the new connection is not interrupted.

15. The system according to claim 14, wherein said resource is a frequency, a frequency band or a channel.

16. The system according to claim 14, wherein said resource comprises a radio frequency equipment.

17. The system according to claim 14, wherein said resource comprises a channel processing hardware.

18. The system according to claim 14, wherein each operator further comprises its own dedicated network infrastructure, wherein said enabling unit is configured to enable the serving operator to further seamlessly share at least a part of the network infrastructure(s) of the other operator(s).

19. The system according to claim 14, wherein said enabling unit is configured to enable said resources sharing upon occurrence of a predetermined condition.

20. The system according to claim 18, wherein said enabling unit is configured to enable the network infrastructure sharing upon occurrence of a predetermined condition.

21. The system according to claim 19, wherein said predetermined condition comprises exhaustion of coverage of said serving operator while other operators provide sufficient coverage.

22. The system according to claim 19, wherein said predetermined condition comprises increase of load or overload in the serving operator's network.

23. The system according to claim 19, wherein said predetermined condition comprises congestion wherein there are no free resources for a new connection.

24. The system according to claim 19, wherein said predetermined condition comprises a situation affecting a predetermined quality service (QoS).

25. The system according to claim 14, wherein interferences on the serving operator's network are too high to fulfill requirements of service subscription for a particular customer requiring high quality carrier.

26. The system according to claim 19, wherein said predetermined condition comprises a situation wherein the costs for the connection are lower in another operator's network than in the serving operator's network.

27. The system according to claim 14, comprising a radio resource management (RRM) unit, wherein said enabling unit is included in said radio resource management (RRM) unit.

* * * * *